(12) United States Patent
Gao et al.

(10) Patent No.: US 10,716,030 B2
(45) Date of Patent: Jul. 14, 2020

(54) METHOD AND DEVICE FOR 3GPP-WLAN AGGREGATION

(71) Applicant: ZTE CORPORATION, Guangdong (CN)

(72) Inventors: Yin Gao, Guangdong (CN); He Huang, Guangdong (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/748,807

(22) PCT Filed: Mar. 21, 2016

(86) PCT No.: PCT/CN2016/076859
§ 371 (c)(1),
(2) Date: Jan. 30, 2018

(87) PCT Pub. No.: WO2016/177151
PCT Pub. Date: Nov. 10, 2016

(65) Prior Publication Data
US 2019/0014498 A1 Jan. 10, 2019

(30) Foreign Application Priority Data
Jul. 31, 2015 (CN) .......................... 2015 1 0465927

(51) Int. Cl.
*H04W 28/08* (2009.01)
*H04W 28/10* (2009.01)
(Continued)

(52) U.S. Cl.
CPC ......... *H04W 28/08* (2013.01); *H04L 63/0876* (2013.01); *H04W 24/02* (2013.01);
(Continued)

(58) Field of Classification Search
None
See application file for complete search history.

(56) References Cited

U.S. PATENT DOCUMENTS

2008/0221918 A1* 9/2008 Petersen ................ G06Q 50/22
705/2
2013/0265985 A1 10/2013 Salkintzis
(Continued)

FOREIGN PATENT DOCUMENTS

| CN | 103391632 A | 11/2013 |
|----|-------------|---------|
| CN | 103582011 A | 2/2014 |

(Continued)

OTHER PUBLICATIONS

LG Electronics, Inc., RAN/WLAN Aggregation Procedure [online], 3GPP T SG-RAN WG2 #89bis R2-151654, 3 pages (Apr. 20-24, 2013).

(Continued)

*Primary Examiner* — Kodzovi Acolatse
(74) *Attorney, Agent, or Firm* — McDonald Hopkins LLC

(57) ABSTRACT

Disclosed are a method and device for 3GPP-WLAN aggregation, including: receiving an aggregation request message transmitted by an access network element; determining an aggregation request result according to a content of the aggregation request message; transmitting the aggregation request result to the access network element.

14 Claims, 4 Drawing Sheets

(51) Int. Cl.
| | |
|---|---|
| *H04W 76/16* | (2018.01) |
| *H04L 29/06* | (2006.01) |
| *H04W 24/02* | (2009.01) |
| *H04W 28/12* | (2009.01) |
| *H04W 28/16* | (2009.01) |
| *H04W 88/06* | (2009.01) |
| *H04W 80/02* | (2009.01) |
| *H04W 84/04* | (2009.01) |
| *H04W 84/12* | (2009.01) |

(52) U.S. Cl.
CPC ........... *H04W 28/10* (2013.01); *H04W 28/12* (2013.01); *H04W 28/16* (2013.01); *H04W 76/16* (2018.02); *H04W 88/06* (2013.01); *H04W 80/02* (2013.01); *H04W 84/042* (2013.01); *H04W 84/12* (2013.01)

(56) References Cited

U.S. PATENT DOCUMENTS

| | | | | |
|---|---|---|---|---|
| 2016/0007255 | A1* | 1/2016 | Sharma | H04W 36/08 370/331 |
| 2016/0255632 | A1* | 9/2016 | Forssell | H04W 76/15 370/329 |
| 2016/0302122 | A1* | 10/2016 | Masini | H04L 61/1511 |
| 2018/0049063 | A1* | 2/2018 | Xu | H04W 28/085 |
| 2018/0070404 | A1* | 3/2018 | Giguet | H04W 72/1257 |
| 2018/0132143 | A1* | 5/2018 | Sirotkin | H04W 88/06 |
| 2018/0227828 | A1* | 8/2018 | Sirotkin | H04W 48/02 |

FOREIGN PATENT DOCUMENTS

| | | |
|---|---|---|
| CN | 103686859 A | 3/2014 |
| EP | 2 897 441 A1 | 7/2015 |
| EP | 3 048 845 A1 | 7/2016 |
| JP | 2013240090 A | 11/2013 |
| JP | 2018-509853 A | 4/2018 |
| WO | 2014013846 A1 | 1/2014 |
| WO | WO2015032043 A1 | 3/2015 |
| WO | 2015/058336 A1 | 4/2015 |
| WO | 2015/141849 A1 | 9/2015 |
| WO | 2016/153306 A1 | 9/2016 |

OTHER PUBLICATIONS

Samsung, WLAN Aggregation, overall DC Procedure [online], 3GPP TSG-RAN WG2#90 R2-152377, 3 pages (May 25-29, 2015).
RAN2, LS on Authentication and Encryption Between UE and WLAN for Aggregation [online], 3GPP TSG-RAN NG2#90 R2-152915, 2 pages (May 25-29, 2015).
Samsung, QoS Handling of Offloaded Bearer in LWA [online], 3GPP TSG-RAN WG2#91bis R2-154371, 3 pages (Oct. 5-9, 2015).
LG Electronics Inc., Consideration on the Procedures of Xw AP [online], 3GPP TSG-RAN WG3#89bis R3-152220, 5 pages (Oct. 5-9, 2015).
Samsung, Discussion on CP of WLAN Aggregation [online], 3GPP TSG-RAN WG3#89 R3-151556, 7 pages (Aug. 24-28, 2015).
Ericsson, Security for WLAN Aggregation [online], 3GPP TSG-RAN WG2#91bis R2-154764, 5 pages (Oct. 5-9, 2015).
ZTE Corporation, Initial Considerations on LTE-WLAN Aggregation [online], 3GPP TSG-RAN WG3#89 R3-151523, 8 pages (Aug. 24-28, 2015).
International Search Report dated Jun. 15, 2016 issued in PCT/CN2016/076859.
CATT: "Discussion on Architectural and Procedure of C-Plane for LTE-WLAN Aggregation", 3GPP Draft; R2-152125—Discussion on Architectural and Procedure of C-Plane-V1, 3rd Generation Partnership Project (3GPP), Mobile Competence Centre; 650, Route Des Lucioles; F-06921; vol. RAN WG2 (5 pages) (May 24, 2015).
"3rd Generation Partnership Project; Technical Specification Group Radio Access Network; Study on Multiple Radio Access Technology (Multi-RAT) Joint Coordination (Release 13)", 3GPP Standard, vol. RAN WG3, No. V13.0.0, pp. 1-24 (Jun. 30, 2015).
Intel Corporation: "WLAN Authentication and Security Aspects of LTE/WLAN Aggregation", 3GPP Draft; R2-152775, Aggregation-Security-V3, 3rd Generation Partnership Project (3GPP), Mobile Competence Centre; 650, Route Des Lucioles, F-06921, vol. RAN WG2 (7 pages) (May 29, 2015).
European Extended Supplementary Search Report dated Jun. 12, 2018 received in European Patent Application No. 16 78 9145.6.

* cited by examiner

METHOD AND DEVICE FOR 3GPP-WLAN AGGREGATION

CROSS-REFERENCE TO RELATED APPLICATION

This application is the 371 application of PCT Application No. PCT/CN2016/076859, filed Mar. 21, 2016, which is based upon and claims priority to Chinese Patent Application No. 201510465927.7, filed Jul. 31, 2015, the entire contents of which are incorporated herein by reference.

TECHNICAL FIELD

The present disclosure relates to, but is not limited to, the wireless cellular communication field.

BACKGROUND

Currently, multiple advanced radio access technologies (Multiple Radio Access Technology: Multi-RAT) coexist, enabling a user terminal to access a wireless network at a high speed and enjoy high-quality services. Typical technologies include wireless wide area network access technologies represented by Long Term Evolution (LTE) and wireless local area network technologies represented by Institute of Electrical and Electronics Engineers (IEEE) 802.11. Wireless Local Area Networks (WLAN) is a network established using a wireless communication technology within a certain local area. The schematic diagram of the architecture of WLAN is shown in FIG. 1. As compared with LTE, WLAN has a small coverage, a high access rate, and a low usage cost.

The LTE network, as a typical network in the 3rd Generation Partnership Project (3GPP) wireless communication family networks, includes an Evolved Universal Terrestrial Radio Access (E-UTRAN) base station eNB (Evolved NodeB) and an Evolved Packet Core (EPC). The network is flattened. The E-UTRAN includes a set of eNBs connected to the EPC through an S1 interface, and the eNBs may be connected with each other through X2. The S1 and X2 are logical interfaces. One EPC may manage at least one eNB, one NodeB may also be controlled by multiple EPCs, and one eNB may manage at least one cell. The Long Term Evolution Advanced (LTE-A) system evolves from the LTE system, and the network architecture is consistent with LTE. The LTE uses 4G technologies. As compared with 3G, LTE has many technical advantages, such as a higher data rate, a lower latency transmission and guaranteed Quality of Service (QoS). As compared with the WLAN, LTE has a broader coverage, and may support high-speed mobility and roaming of the user terminal.

With the continuous evolution of future communication networks, coexistence of multiple standard network modes is an unavoidable trend, including converged networking (fusion networking) of 2G, 3G and LTE, converged networking of 3GPP-WLAN, and so on. The schematic diagram of the converged networking of LTE-WLAN is shown in FIG. 2. Due to complementary feature(s) of WLAN and 3GPP wireless communication family networks, interconnection and internetworking of 3GPP-WLAN have become one of the hot issues among device manufacturers, system integrators, operators and research institutes. The basic principle is to minimize the impact on existing standards and systems of WLAN and 3GPP, that is, to keep the WLAN standard unchanged and to minimize the modification to the existing 3GPP specifications. The key for interconnection and comprehensive structure design between 3GPP and WLAN is to provide interaction functions between 3GPP and WLAN based on the IEEE 802.11 standard.

The interconnection between 3GPP and WLAN is based on a direct interface between the two systems. "Wireless LAN Termination" (WT) is defined as a termination point of a LTE-WLAN interface Xw at the WLAN system side. The WT may be a logical entity, may be an independent network element, or may be implemented on a Wireless Access Point/Wireless Access Controller (AC/AP). Multiple WLAN access network elements may be connected under the WT. When a user accesses the 3GPP system, such as the LTE eNB, LTE-WLAN aggregation operations may be implemented by establishing, modifying, or deleting the WT. Both the LTE and WLAN systems provide data transmission for UEs, thereby user throughput and network capacity are improved.

Therefore, when 3GPP and WLAN are integrated or converged, how to realize 3GPP-WLAN aggregation so as to achieve offload under a cross-system scenario is an urgent problem.

This section provides background information related to the present disclosure which is not necessarily prior art.

SUMMARY

The following is a summary of subject matters of the present disclosure which will be described below in detailed description. The summary is not intended to limit the protection scope as defined by claims.

The present disclosure provides a method and a device for 3GPP-WLAN aggregation, which are capable of realizing aggregation in a 3GPP-WLAN converged networking scenario.

There is provided a method for 3GPP-WLAN aggregation, including:

receiving an aggregation request message sent from an access network element;

determining an aggregation request result according to a content of the aggregation request message; and sending the aggregation request result to the access network element.

The aggregation request message may include a request message for establishing a wireless network element, a request message for deleting a wireless network element, and a request message for modifying a wireless network element.

According to an exemplary embodiment, when the aggregation request message is a request message for establishing a wireless network element, the aggregation request message includes at least one of identification information for identifying User Equipment (UE), information of requesting bearer to be offloaded, aggregation configuration information, Public Land Mobile Network (PLMN) information selected for aggregation, maximum rate information requested by the aggregation, authentication information of the UE, key information of the UE, and IP address information for user data transmission of the UE.

According to an exemplary embodiment, the determining the aggregation request result according to the content of the aggregation request message includes:

determining at least one of information of bearer which accepts offload, information of bearer which rejects offload, and information of failed establishment, according to the information of requesting bearer to be offloaded in the aggregation request message and bearing capacity information of the wireless network element; and determining maximum rate information allowed for UE aggregation, according to the maximum rate information requested by the aggregation in the aggregation request message and the bearing capacity information of the wireless network element.

According to an exemplary embodiment, after sending the aggregation request result to the access network element, the method further includes:

receiving configuration completion information for the wireless network element sent by the access network element, wherein the configuration completion information for the wireless network element is used to determine that a re-configuration of an air interface of the UE is completed and an aggregation configuration is completed.

According to an exemplary embodiment, when the aggregation request message is a request message for deleting a wireless network element, the aggregation request message includes at least one of identification information for identifying User Equipment (UE), information indicating a reason for deleting the wireless network element, and bearer deletion information.

According to an exemplary embodiment, after sending the aggregation request result to the access network element, the method further includes:

receiving from the access network element a confirmation message for confirming deletion of the wireless network element.

According to an exemplary embodiment, when the aggregation request message is a request message for modifying a wireless network element, the aggregation request message includes at least one of identification information for identifying User Equipment (UE), information indicating a reason for modifying the wireless network element, instruction information for instructing modification of the wireless network element, information of requesting modification of bearer to be offloaded, aggregation configuration information, information of serving Public Land Mobile Network (PLMN) information, maximum rate information requested by the aggregation, authentication information of the UE, key information of the UE, and IP address information for user data transmission of the UE.

According to an exemplary embodiment, the determining the aggregation request result according to the content of the aggregation request message, includes:

determining at least one of information of bearer to be offloaded which accepts modification, information of bearer to be offloaded which rejects modification, and information of failed establishment, according to the information of requesting modification of bearer to be offloaded in the aggregation request message and bearing capacity information of the wireless network element; and determining maximum rate information allowed for UE aggregation, according to the maximum rate information requested by the aggregation in the aggregation request message and the bearing capacity information of the wireless network element.

According to an exemplary embodiment, the aggregation configuration information includes at least one of a wireless Access Point (AP) list, related AP measurement information reported by the UE, and Media Access Control (MAC) address information of the UE.

The AP list includes information of one or more Aps.

There is also provided a device for 3GPP-WLAN aggregation, including:

a receiving module configured to receive an aggregation request message sent from an access network element;

an analysis module configured to determine an aggregation request result according to a content of the aggregation request message; and a sending module configured to send the aggregation request result to the access network element.

According to an exemplary embodiment, when the aggregation request message is a request message for establishing a wireless network element, the analysis module is configured to:

determine at least one of information of bearer which accepts offload, information of bearer which rejects offload, and information of failed establishment, according to the information of requesting bearer to be offloaded in the aggregation request message and bearing capacity information of the wireless network element; and determine maximum rate information allowed for UE aggregation, according to the maximum rate information requested by the aggregation in the aggregation request message and the bearing capacity information of the wireless network element.

According to an exemplary embodiment, the receiving module is further configured to:

receive configuration completion information for the wireless network element sent by the access network element, wherein the configuration completion information for the wireless network element is used to determine that a re-configuration of an air interface of the UE is completed and an aggregation configuration is completed.

According to an exemplary embodiment, when the aggregation request message is a request message for deleting a wireless network element, the receiving module is further configured to:

receive from the access network element a confirmation message for confirming deletion of the wireless network element.

According to an exemplary embodiment, when the aggregation request message is a request message for modifying a wireless network element, the analysis module is configured to:

determine at least one of information of bearer to be offloaded which accepts modification, information of bearer to be offloaded which rejects modification, and information of failed establishment, according to the information of requesting modification of bearer to be offloaded in the aggregation request message and bearing capacity information of the wireless network element; and determine maximum rate information allowed for UE aggregation, according to the maximum rate information requested by the aggregation in the aggregation request message and the bearing capacity information of the wireless network element.

There is also provided a computer-readable storage medium for storing computer executable instructions, which are configured to perform any one of the above-described methods.

The methods and devices provided by the embodiments of the present disclosure can realize aggregation under the 3GPP-WLAN converged networking scenario, enabling multiple systems to provide services for UEs.

Other aspects will be appreciated after reading and understanding of the drawings and the detailed descriptions.

This section provides a summary of various implementations or examples of the technology described in the disclosure, and is not a comprehensive disclosure of the full scope or all features of the disclosed technology.

DETAILED DESCRIPTION

Implementations of the present disclosure will be described below with reference to drawings. It should be noted that if there is no conflict, embodiments and features in the embodiments of the present disclosure can be combined with each other in any manner.

Figure 1:
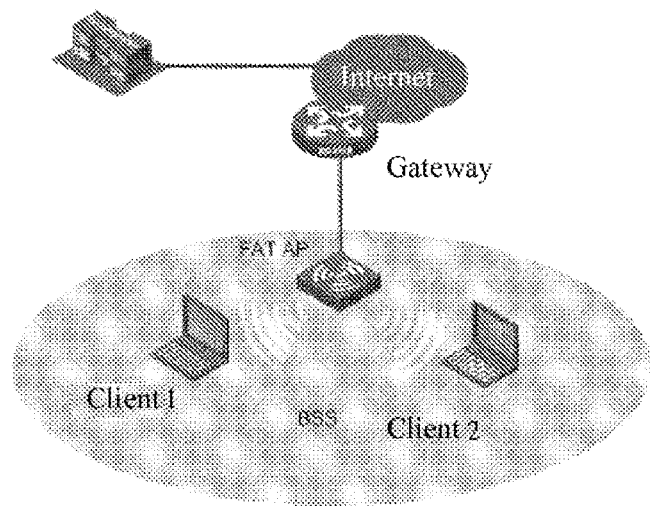
FIG. 1 is a schematic diagram showing an architecture of a WLAN system in related arts.
Figure 2:
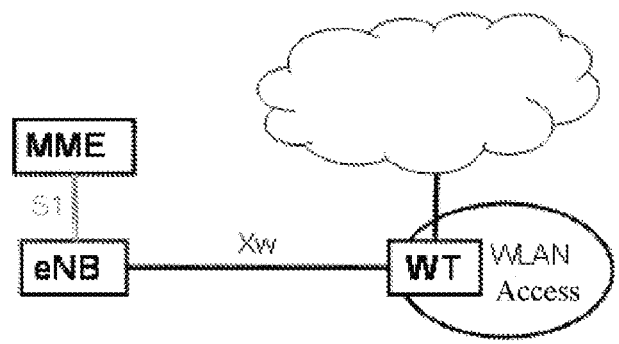
FIG. 2 is a schematic diagram showing an architecture of LTE-WLAN converged networking in related arts.
Figure 3:
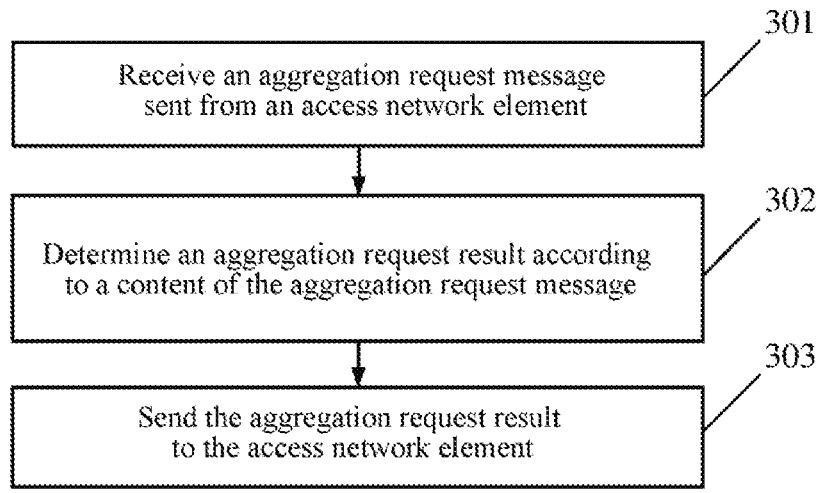
FIG. 3 is a flowchart showing a method for aggregation in 3GPP-WLAN converged networking according to an embodiment of the present disclosure.

FIG. 3 is a flowchart showing a method for 3GPP-WLAN aggregation according to an embodiment of the present disclosure. The method may include the following steps.

In step 301, an aggregation request message sent from an access network element is received.

In step 302, an aggregation request result is determined according to a content of the aggregation request message.

In step 303, the aggregation request result is sent to the access network element.

The aggregation request message may include a request message for establishing a wireless network element, a request message for deleting a wireless network element, and a request message for modifying a wireless network element.

If the aggregation request message is the request message for establishing a wireless network element, the aggregation request message may include at least one of the follows: identification information for identifying User Equipment (UE), information of requesting bearer to be offloaded, aggregation configuration information, Public Land Mobile Network (PLMN) information suggested by aggregation (selected for aggregation), maximum rate information requested by the aggregation, authentication information of the UE, key information of the UE, and IP address information for data transmission of UE user.

According to an exemplary embodiment, the aggregation configuration information includes, but is not limited to, at least one of the following information: an AP list, related AP measurement information reported by the UE, and MAC address information of the UE. The AP list may include information of one or more APs.

The step of determining an aggregation request result according to a content of the aggregation request message includes:

determining at least one of information of bearer which accepts offload, information of bearer which rejects offload, and information of failed establishment, according to the information of requesting bearer to be offloaded in the aggregation request message and bearing capacity information of the wireless network element; and determining maximum rate information allowed for UE aggregation, according to the maximum rate information requested by the aggregation in the aggregation request message and the bearing capacity information of the wireless network element.

The bearing capacity information of the wireless network element may be determined by information such as a local load of the network element, a processing capability of hardware and so on.

After sending the aggregation request result to the access network element, the method may further include:

receiving configuration completion information for the wireless network element sent by the access network element, wherein the configuration completion information for the wireless network element is used to determine that a re-configuration of an air interface of the UE is completed and an aggregation configuration is completed.

When the aggregation request message is the request message for deleting a wireless network element, the aggregation request message may include at least one of the follows: identification information for identifying User Equipment (UE), information indicating a reason for deleting the wireless network element, and bearer deletion information.

After sending the aggregation request result to the access network element, the method may further include:

receiving from the access network element a confirmation message for confirming deletion of the wireless network element.

When the aggregation request message is the request message for modifying a wireless network element, the aggregation request message may include at least one of the follows: identification information for identifying User Equipment (UE), information indicating a reason for modifying the wireless network element, information for instructing modification of the wireless network element, information for requesting modification of bearer to be offloaded, aggregation configuration information, information of serving Public Land Mobile Network (PLMN), maximum rate information requested by the aggregation, authentication information of the UE, key information of the UE, and IP address information for data transmission of UE user.

According to an exemplary embodiment, the aggregation configuration information includes, but is not limited to, at least one of the following information: an AP list, related AP measurement information reported by the UE, and MAC address information of the UE. The AP list may include information of one or more APs.

The step of determining an aggregation request result according to a content of the aggregation request message may include:

determining at least one of information of bearer to be offloaded which accepts modification, information of bearer to be offloaded which rejects modification, and information of failed establishment, according to the information of requesting modification of bearer to be offloaded in the aggregation request message and bearing capacity information of the wireless network element; and determining maximum rate information allowed for UE aggregation, according to the maximum rate information requested by the aggregation in the aggregation request message and the bearing capacity information of the wireless network element.

An embodiment of the present disclosure also provides a computer-readable storage medium for storing computer executable instructions, which may be configured to perform the above described methods.

Figure 4:
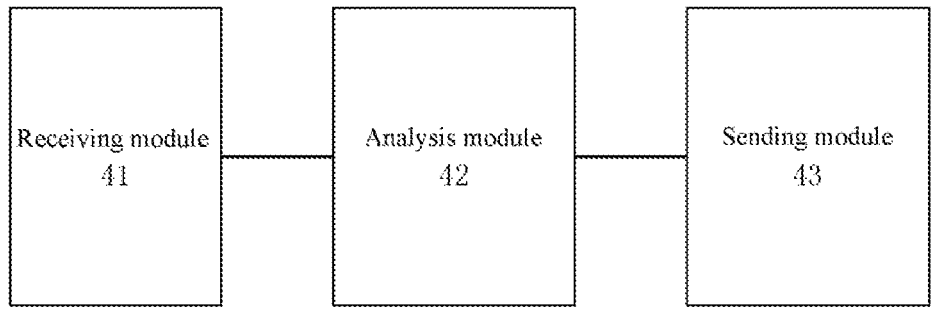
FIG. 4 is a block diagram showing a device for aggregation in 3GPP-WLAN converged networking according to an embodiment of the present disclosure.

As shown in FIG. 4, a device for 3GPP-WLAN aggregation may include: a receiving module 41, an analysis module 42, and a sending module 43.

The receiving module 41 is configured to receive an aggregation request message sent from an access network element.

The analysis module 42 is configured to determine an aggregation request result according to a content of the aggregation request message.

The sending module 43 is configured to send the aggregation request result to the access network element.

When the aggregation request message is a request message for establishing a wireless network element, the analysis module may be configured to:

determine at least one of information of bearer which accepts offload, information of bearer which rejects offload, and information of failed establishment, according to the information of requesting bearer to be offloaded in the aggregation request message and bearing capacity information of the wireless network element; and determine maximum rate information allowed for UE aggregation, according to the maximum rate information requested by the aggregation in the aggregation request message and the bearing capacity information of the wireless network element.

The receiving module may be further configured to:

receive configuration completion information for the wireless network element sent by the access network element, wherein the configuration completion information for the wireless network element is used to determine that a re-configuration of an air interface of the UE is completed and an aggregation configuration is completed.

When the aggregation request message is a request message for deleting a wireless network element, the receiving module may be further configured to:

receive from the access network element a confirmation message for confirming deletion of the wireless network element.

When the aggregation request message is a request message for modifying a wireless network element, the analysis module may be configured to:

determine at least one of information of bearer to be offloaded which accepts modification, information of bearer to be offloaded which rejects modification, and information of failed establishment, according to the information of requesting modification of bearer to be offloaded in the aggregation request message and bearing capacity information of the wireless network element; and determine maximum rate information allowed for UE aggregation, according to the maximum rate information requested by the aggregation in the aggregation request message and the bearing capacity information of the wireless network element.

In the following descriptions of embodiments, for simplicity purposes, for example, the network element at the access network side in the 3GPP system is an eNB, and the network element in the WLAN system is a WT. Alternatively, in a 3G system, the network element at the access network side may be an RNC. The network element in the WLAN system may be an AP or an AC.

First Embodiment

Figure 5:
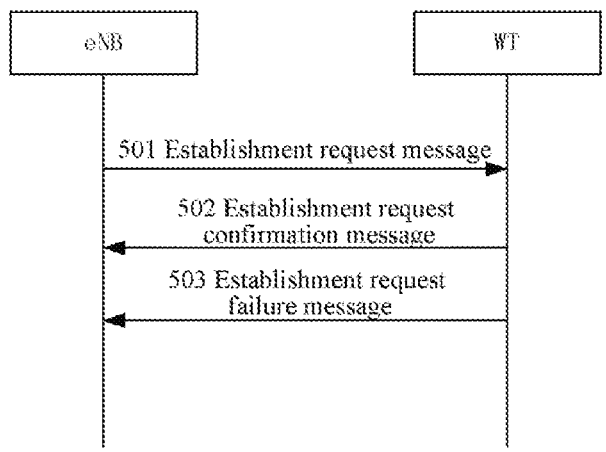
FIG. 5 is a flowchart showing WT establishment according to a first embodiment of the present disclosure.

The process for establishing a WT is shown in FIG. 5.

In step 501, an eNB sends an establishment request message to a WT. The message may include at least one of the following kinds of information:

Identification information for identifying UE. The identification information for identifying UE may be mark information on an interface for uniquely identifying the UE, for example, eNB UE Xw AP ID, and WT UE Xw AP ID. Or, only Xw UE ID may be used to uniquely identifying the UE at both ends. There are currently three possible forms of the Xw UE ID: UE WLAN MAC address, UE IMSI, and PTID.

Information of bearer needing to be offloaded at the WT side. The bearer-related information includes, but is not limited to: a bearer ID, QoS information, and a bearer uplink transmission address. According to an exemplary embodiment, the determination of which bearers may be WLAN-offloaded may be made by UE, or may be made by a base station, depending on properties of the bearers. The bearers which may be offloaded may be indicated, and the indication information may be a part of the bearer-related information.

Aggregation configuration information. The aggregation configuration includes, but is not limited to, an AP list (including information of one or more APs), related AP measurement information reported by the UE, and the MAC address information of the UE. In the case of a network-assisted aggregation manner, it is only needed to carry the AP information reported by the UE. In the case of a network control aggregation manner and the eNB determines the APs which participate the aggregation, the eNB determines information of the APs which participate the aggregation and notifies the WT of such information. Alternatively, if the APs which participate the aggregation are determined by the WT, the eNB notifies the WT of the list of APs measured by the UE and the measurement result, and then the WT may make a selection. Alternatively, the eNB notifies the WT of the MAC address information of the UE, and the WT may know the APs which the UE currently is connected to according to the MAC address information of the UE.

For a WT device controlled by an operator, the eNB may notify the WT of the PLMN selected for the aggregation.

In order to better realize offload control, the WT may be informed of the maximum rate for UE aggregation at the WT side selected for the aggregation.

If it is needed, authentication information and key information of the UE may be included.

If the UE has accessed the WLAN system, the IP address information for data transmission of the UE may be included.

In step 502, if the process at the WT is successful, the WT sends an establishment request confirmation message to the eNB. If the process at the WT is failed, the flow proceeds to step 503. The establishment request confirmation message may include at least one of the following kinds of information:

Identification information for identifying UE. The identification information for identifying UE may be identification information for uniquely identifying the UE on an interface, for example, eNB UE Xw AP ID, and WT UE Xw AP ID. Or, only Xw UE ID may be used to uniquely identifying the UE at both ends. There are currently three possible forms of the Xw UE ID: UE WLAN MAC address, UE IMSI, and PTID.

Information of bearer(s) at the WT side which accept(s) offload. The bearer-related information may include, but is not limited to, a bearer ID, QoS information and a bearer downlink transmission address.

Information of bearer(s) at the WT side which reject(s) offload. The bearer-related information may include, but is not limited to, a bearer ID, and a reason for the rejection.

Aggregation configuration information. The aggregation configuration information includes, but is not limited to, an AP list (including information of one or more APs). If the UE initiates firstly the AP access, the WT may not carry any AP information. If the UE initiates the AP access later, the WT may notify the eNB of suggested AP-related information.

The maximum rate for UE aggregation acceptable for the WT side. The WT may notify the eNB of the maximum rate for UE aggregation which can be accepted by the WT according to the situation of the WT itself.

In 503, if the process at the WT is failed, the WT sends an establishment request failure message to the eNB. The establishment request failure message may include one or more kinds of the following information:

Identification information for identifying a UE. The identification information for identifying a UE may be identification information for uniquely identifying the UE on an interface, for example, eNB UE Xw AP ID, and WT UE Xw AP ID. Or, only Xw UE ID may be used to uniquely identifying the UE at both ends. There are currently three possible forms of the Xw UE ID: UE WLAN MAC address, UE IMSI, and PTID.

Reason for the rejection.

According to an exemplary embodiment, after the air interface re-configuration of the UE is completed, the eNB sends a WT configuration completion message to the WT so as to notify the WT that the UE has been prepared for the LTE-WLAN aggregation. This message may include at least one of the following kinds of information:

Identification information for identifying UE. The identification information for identifying UE may be identification information for uniquely identifying the UE on an interface, for example, eNB UE Xw AP ID, and WT UE Xw AP ID. Or, only Xw UE ID may be used to uniquely identifying the UE at both ends. There are currently three possible forms of the Xw UE ID: UE WLAN MAC address, UE IMSI, and PTID.

Aggregation configuration information finally confirmed by the eNB. In the case of a network control manner, the eNB may determine whether to accept the configuration provided by the WT in the establishment confirmation message.

IP address information for data transmission of the UE.

Second Embodiment

Figure 6:
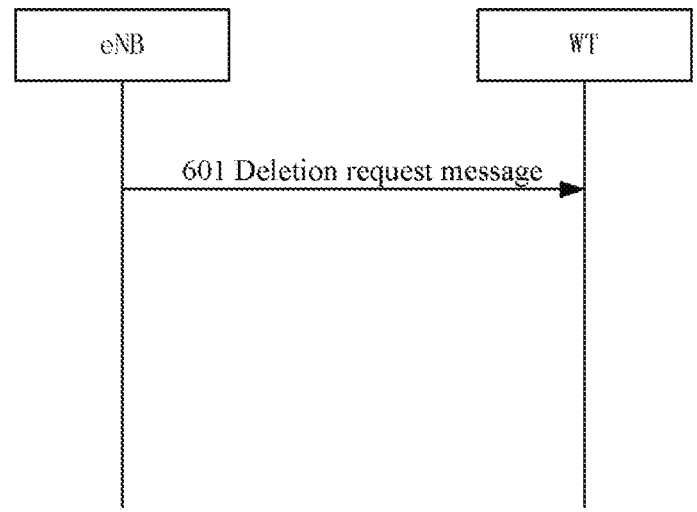
FIG. 6 is a flowchart showing WT deletion triggered by an eNB according to a second embodiment of the present disclosure.

The process of WT deletion is shown in FIG. 6.

In step 601, an eNB sends a deletion message to a WT. The deletion message may include at least one of the following kinds of information:

Identification information for identifying a UE. The identification information for identifying a UE may be identification information for uniquely identifying the UE on an interface, for example, eNB UE Xw AP ID, and WT UE Xw AP ID. Or, only Xw UE ID may be used to uniquely identifying the UE at both ends. There are currently three possible forms of the Xw UE ID: UE WLAN MAC address, UE IMSI, and PTID.

WT deletion reason. The reason for release triggered by the eNB may be caused by reporting measurements by the UE or abnormal indication reported by the UE (for example, a change of UE preference, or turn-off of the WLAN by the user, or the like), or may be a flow-control-related trigger.

Information of deleted bearer(s). Only a bearer for performing data forwarding needs forwarding an address notification.

Third Embodiment

Figure 7:
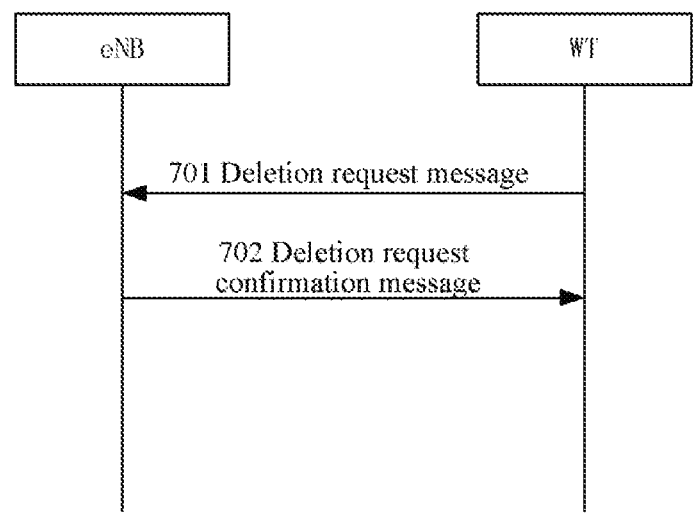
FIG. 7 is a flowchart showing WT deletion triggered by a WT according to a third embodiment of the present disclosure.

The process of WT deletion is shown in FIG. 7.

In step 701, a WT sends a deletion request message to an eNB. The message may include at least one of the following kinds of information:

Identification information for identifying UE. The identification information for identifying UE may be identification information for uniquely identifying the UE on an interface, for example, eNB UE Xw AP ID, and WT UE Xw AP ID. Or, only Xw UE ID may be used to uniquely identifying the UE at both ends. There are currently three possible forms of the Xw UE ID: UE WLAN MAC address, UE IMSI, and PTID.

WT deletion reason. The reason for release triggered by the WT may be that the AP is turned off automatically or the AP is in an energy saving mode, or a tight coupling function of the AP is turned off.

In step 702 (this is an optional step), the eNB sends a deletion confirmation message to the WT. The message includes at least one of the following kinds of the information:

Identification information for identifying UE. The identification information for identifying UE may be identification information for uniquely identifying the UE on an interface, for example, eNB UE Xw AP ID, and WT UE Xw AP ID. Or, only Xw UE ID may be used to uniquely identifying the UE at both ends. There are currently three possible forms of the Xw UE ID: UE WLAN MAC address, UE IMSI, and PTID.

Information of deleted bearer(s). Only a bearer for performing data forwarding needs forwarding an address notification.

Fourth Embodiment

Figure 8:
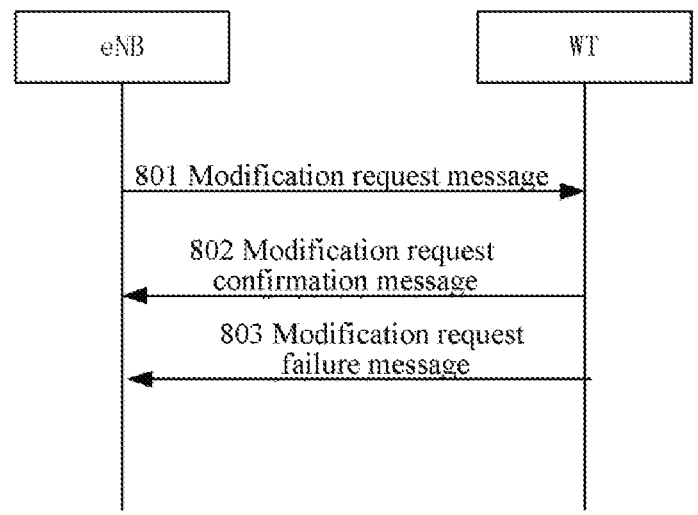
FIG. 8 is a flowchart showing WT modification triggered by an eNB according to a fourth embodiment of the present disclosure.

The process of WT modification is shown in FIG. 8.

In step 801, an eNB sends a modification request message to a WT. The message may include at least one of the following kinds of information:

Identification information for identifying UE. The identification information for identifying UE may be identification information for uniquely identifying the UE on an interface, for example, eNB UE Xw AP ID, and WT UE Xw AP ID. Or, only Xw UE ID may be used to uniquely identifying the UE at both ends. There are currently three possible forms of the Xw UE ID: UE WLAN MAC address, UE IMSI, and PTID.

WT modification reason or instruction, which may include, but is not limited to, the following reasons: a change of the AP configuration under the WT, or a change of the type of a bearer (for example, a bearer to be offloaded is changed into a normal bearer).

Information of bearer(s) for offload at the WT side which is needed to be modified. The information may include at least one of the following forms: a list of established bearer(s), a list of modified bearer(s), and a list of deleted bearer(s). The bearer-related information may include, but is not limited to, a bearer ID, QoS information, a bearer uplink transmission address, and a downlink data forwarding address.

Aggregation configuration information. The information of the AP needing to be newly accessed by the UE, which is triggered by the eNB, may include, but is not limited to, an AP list (including information of one or more APs), related AP measurement information reported by the UE and the MAC address information of the UE.

For a WT device controlled by an operator, the eNB may notify the WT of a serving PLMN.

To better realize offload flow control, the maximum rate for UE aggregation at the WT side selected for the aggregation may be also notified to the WT.

If it is needed, authentication information and key information of the UE may be included.

If the UE has accessed the WLAN system, the IP address information for data transmission of the UE may be included.

In step 802, if the process at the WT is successful, the WT sends a modification request confirmation message to the eNB. If the process at the WT is failed, the flow proceeds to step 803. The modification request confirmation message may include at least one of the following kinds of information:

Identification information for identifying a UE. The identification information for identifying a UE may be identification information for uniquely identifying the UE on an interface, for example, eNB UE Xw AP ID, and WT UE Xw AP ID. Or, only Xw UE ID may be used to uniquely identifying the UE at both ends. There are currently three possible forms of the Xw UE ID: UE WLAN MAC address, UE IMSI, and PTID.

Information of bearer(s) for offload at the WT side which accept(s) modification. The information may include at least one of the following forms: a list of bearer(s) which accept(s) establishment, a list of bearer(s) which accept(s) modification and a list of bearer(s) which accept(s) deletion. The bearer-related information may include, but is not limited to a bearer ID, QoS information and a bearer downlink transmission address.

Information of bearer(s) for offload at the WT side which reject(s) modification. The bearer-related information may include, but is not limited to, a bearer ID, and a reason for the rejection.

Aggregation configuration information. If an AP change occurs at the WT, such change may be told to the eNB. The information may include, but is not limited to, an AP list (including information of one or more APs).

The maximum rate for UE aggregation acceptable for the WT side. The WT may notify the eNB of the maximum rate for UE aggregation which is accepted by the WT according to the situation of the WT itself.

In step 803, if the process at the WT is failed, the WT sends a modification request failure message to the eNB. The message may include one or more kinds of the following information:

Identification information for identifying UE. The identification information for identifying UE may be identification information for uniquely identifying the UE on an interface, for example, eNB UE Xw AP ID, and WT UE Xw AP ID. Or, only Xw UE ID may be used to uniquely identifying the UE at both ends. There are currently three possible forms of the Xw UE ID: UE WLAN MAC address, UE IMSI, and PTID.

Reason for the rejection.

According to an exemplary embodiment, after the air interface re-configuration of the UE is completed, the eNB sends a WT configuration completion message to the WT so as to notify the WT that the UE has been prepared for the LTE-WLAN aggregation.

Fifth Embodiment

Figure 9:
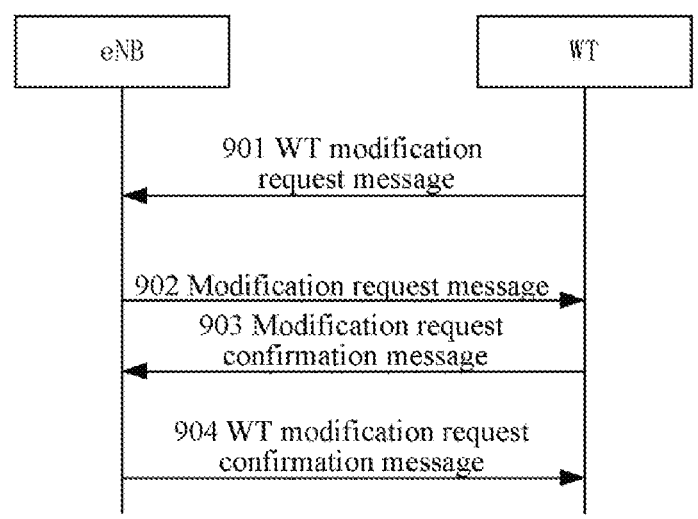
FIG. 9 is a flowchart showing WT modification triggered by a WT according to a fifth embodiment of the present disclosure.

The process of WT modification is shown in FIG. 9.

In step 901, a WT sends a WT modification request message to an eNB. The message may include at least one of the following kinds of information:

Identification information for identifying UE. The identification information for identifying UE may be identification information for uniquely identifying the UE on an interface, for example, eNB UE Xw AP ID, and WT UE Xw AP ID. Or, only Xw UE ID may be used to uniquely identifying the UE at both ends. There are currently three possible forms of the Xw UE ID: UE WLAN MAC address, UE IMSI, and PTID.

WT modification reason or instruction, which includes, but is not limited to, the following reasons: a change of the AP configuration under the WT, or a change of the type of a bearer (for example, a bearer to be offloaded is changed into a normal bearer).

Information of bearer(s) for offload which is suggested to be released at the WT side. The bearer-related information may include, but is not limited to, a bearer ID, and a reason for the release.

Aggregation configuration information. If an AP change occurs at the WT, the WT may notify the eNB of the change. The information may include, but is not limited to, an AP list (including information of one or more APs).

In step 902, the eNB sends a modification request message to the WT. The content of this message is the same as that in the WT modification process triggered by the eNB.

In step 903, the WT sends a modification confirmation message to the eNB. The content of this message is the same as that in the WT modification process triggered by the eNB.

In step 904, the eNB sends a WT modification confirmation message. This message may include at least one of the following kinds of the information:

Identification information for identifying UE. The identification information for identifying UE may be identification information for uniquely identifying the UE on an interface, for example, eNB UE Xw AP ID, and WT UE Xw AP ID. Or, only Xw UE ID may be used to uniquely identifying the UE at both ends. There are currently three possible forms of the Xw UE ID: UE WLAN MAC address, UE IMSI, and PTID.

Aggregation configuration information. The information may include the WT configuration information confirmed by the eNB, including but not limited to an AP list (including information of one or more APs).

In practical implementations, the network element at the access network side in the 3GPP system may be an eNB or an RNC, and the WLAN network element may be a WT, or an AP, or an AC.

A person of ordinary skill in the art may understand that all or part of the steps of the foregoing embodiments may be implemented by using computer program which may be stored in a computer readable storage medium and is implemented on a corresponding hardware platform (for example, a system, equipment, an apparatus, a device, and so on), and when executed, the program includes one or a combination of the steps of the method embodiments.

According to exemplary embodiments, all or part of the steps in the above embodiments may also be implemented by using integrated circuits. These steps may be separately manufactured as one integrated circuit module or multiple modules or steps may be made into a single integrated circuit module.

The devices/functional modules/functional units in the above embodiments can be implemented by using general-purpose computing devices, which can be centralized on a single computing device or distributed over a network formed by multiple computing devices.

When the devices/function modules/function units in the foregoing embodiment are implemented in the form of a software function module and is sold or used as an independent product, the devices/function modules/function units may be stored in a computer-readable storage medium. The above-mentioned computer-readable storage medium may be a read-only memory, a magnetic disk, an optical disk, or the like.

A person of ordinary skill in the art should understand that modifications or equivalent replacements may be made to the technical solutions of the present disclosure without departing from the spirit and scope of the technical solutions of the present disclosure and such modifications and replacements should all fall within the scope of the claims of the present disclosure.

INDUSTRIAL APPLICABILITY

The methods and devices provided by the embodiments of the present disclosure can realize aggregation under the 3GPP-WLAN converged networking scenario, enabling multiple systems to provide services for UEs.

What is claimed is:

1. A method for 3GPP-WLAN aggregation, comprising:
receiving an aggregation request message sent from an access network element;
determining an aggregation request result according to a content of the aggregation request message; and
sending the aggregation request result to the access network element,
wherein the aggregation request message is a request message for establishing a wireless network element or a request message for modifying a wireless network element,
wherein the aggregation request message comprises: identification information for identifying a User Equipment (UE), aggregation configuration information, Public Land Mobile Network (PLMN) information selected for aggregation, and security key information of the UE,
wherein the aggregation configuration information comprises at least one of a wireless Access Point (AP) list, related AP measurement information reported by the UE, and Media Access Control (MAC) address information of the UE,
wherein when the aggregation request message is a request message for modifying a wireless network element, the aggregation request message further comprises information of requesting modification of bearer to be offloaded, and
determining at least one of information of bearer to be offloaded which accepts modification, information of bearer to be offloaded which rejects modification, and information of failed modification, according to the information of requesting modification of bearer to be offloaded.

2. The method according to claim 1, wherein when the aggregation request message is a request message for establishing a wireless network element, the aggregation request message further comprises: information of requesting bearer to be offloaded and at least one of maximum rate information requested by the aggregation, authentication information of the UE, and IP address information for user data transmission of the UE.

3. The method according to claim 2, wherein the determining the aggregation request result according to the content of the aggregation request message comprises:
determining at least one of information of bearer which accepts offload, information of bearer which rejects offload, and information of failed establishment, according to the information of requesting bearer to be offloaded in the aggregation request message and bearing capacity information of the wireless network element; and
determining maximum rate information allowed for UE aggregation, according to the maximum rate information requested by the aggregation in the aggregation request message and the bearing capacity information of the wireless network element.

4. The method according to claim 1, wherein when the aggregation request message is the request message for modifying a wireless network element, the aggregation request message further comprises: information for instructing modification of the wireless network element and at least one of information indicating a reason for modifying the wireless network element, maximum rate information requested by the aggregation, authentication information of the UE, and IP address information for user data transmission of the UE.

5. The method according to claim 4, wherein the determining the aggregation request result according to the content of the aggregation request message, further comprises:
determining maximum rate information allowed for UE aggregation, according to the maximum rate information requested by the aggregation in the aggregation request message and the bearing capacity information of the wireless network element.

6. The method according to claim 1, wherein in the case where the aggregation request message is a request message for establishing a wireless network element, after sending the aggregation request result to the access network element, the method further comprises:
receiving configuration completion information for the wireless network element sent by the access network element, wherein the configuration completion information for the wireless network element is used to determine that a re-configuration of an air interface of the UE is completed and an aggregation configuration is completed.

7. A device for 3GPP-WLAN aggregation, comprising:
a processor; and
a memory for storing instructions executable by the processor;
wherein the processor is configured to:
receive an aggregation request message sent from an access network element;
determine an aggregation request result according to a content of the aggregation request message; and send the aggregation request result to the access network element,
wherein the aggregation request message is a request message for establishing a wireless network element or a request message for modifying a wireless network element, and
wherein the aggregation request message comprises: identification information for identifying a User Equipment (UE), aggregation configuration information, Public Land Mobile Network (PLMN) information selected for aggregation, and security key information of the UE,
wherein the aggregation configuration information comprises at least one of a wireless Access Point (AP) list, related AP measurement information reported by the UE, and Media Access Control (MAC) address information of the UE,
wherein when the aggregation request message is a request message for modifying a wireless network element, the aggregation request message further comprises information of requesting modification of bearer to be offloaded, and the processor is further configured to:
determine at least one of information of bearer to be offloaded which accepts modification, information of bearer to be offloaded which rejects modification, and information of failed modification, according to the information of requesting modification of bearer to be offloaded in the aggregation request message.

8. The device according to claim 7, wherein when the aggregation request message is a request message for establishing a wireless network element, the aggregation request message further comprises information of requesting bearer to be offloaded and maximum rate information requested by the aggregation, and the processor is further configured to:
determine at least one of information of bearer which accepts offload, information of bearer which rejects offload, and information of failed establishment, according to the information of requesting bearer to be offloaded in the aggregation request message and bearing capacity information of the wireless network element; and
determine maximum rate information allowed for UE aggregation, according to the maximum rate information requested by the aggregation in the aggregation request message and the bearing capacity information of the wireless network element.

9. The device according to claim 7, wherein when the aggregation request message is the request message for modifying a wireless network element, the aggregation request message further comprises maximum rate information requested by the aggregation, and the processor is further configured to:
determine maximum rate information allowed for UE aggregation, according to the maximum rate information requested by the aggregation in the aggregation request message and the bearing capacity information of the wireless network element.

10. The device for 3GPP-WLAN aggregation of claim 7, wherein in the case where the aggregation request message is a request message for establishing a wireless network element, after sending the aggregation request result to the access network element, the processor is further configured to:
receive configuration completion information for the wireless network element sent by the access network element, wherein the configuration completion information for the wireless network element is used to determine that a re-configuration of an air interface of the UE is completed and an aggregation configuration is completed.

11. A non-transitory computer-readable storage medium for storing computer executable instructions, which are configured to:
receive an aggregation request message sent from an access network element;
determine an aggregation request result according to a content of the aggregation request message; and
send the aggregation request result to the access network element,
wherein the aggregation request message is a request message for establishing a wireless network element or a request message for modifying a wireless network element,
wherein the aggregation request message comprises: identification information for identifying a User Equipment (UE), aggregation configuration information, Public Land Mobile Network (PLMN) information selected for aggregation, and security key information of the UE,
wherein the aggregation configuration information comprises at least one of a wireless Access Point (AP) list, related AP measurement information reported by the UE, and Media Access Control (MAC) address information of the UE,
wherein when the aggregation request message is a request message for modifying a wireless network element, the aggregation request message further comprises information of requesting modification of bearer to be offloaded, and the determining the aggregation request result according to the content of the aggregation request message comprises:
determining at least one of information of bearer to be offloaded which accepts modification, information of bearer to be offloaded which rejects modification, and information of failed modification, according to the information of requesting modification of bearer to be offloaded.

12. The non-transitory computer-readable storage medium of claim 11, wherein when the aggregation request message is a request message for establishing a wireless network element, the aggregation request message further comprises information of requesting bearer to be offloaded and maximum rate information requested by the aggregation, and the computer executable instructions are further configured to:
determine at least one of information of bearer which accepts offload, information of bearer which rejects offload, and information of failed establishment, according to the information of requesting bearer to be offloaded in the aggregation request message and bearing capacity information of the wireless network element; and
determine maximum rate information allowed for UE aggregation, according to the maximum rate information requested by the aggregation in the aggregation request message and the bearing capacity information of the wireless network element.

13. The non-transitory computer-readable storage medium of claim 11, wherein when the aggregation request message is the request message for modifying a wireless network element, the aggregation request message further comprises maximum rate information requested by the aggregation, and the computer executable instructions are further configured to:

determine maximum rate information allowed for UE aggregation, according to the maximum rate information requested by the aggregation in the aggregation request message and the bearing capacity information of the wireless network element.

14. The non-transitory computer-readable storage medium of claim 11, wherein in the case where the aggregation request message is a request message for establishing a wireless network element, after sending the aggregation request result to the access network element, the computer executable instructions are further configured to:

receive configuration completion information for the wireless network element sent by the access network element, wherein the configuration completion information for the wireless network element is used to determine that a re-configuration of an air interface of the UE is completed and an aggregation configuration is completed.

\* \* \* \* \*